United States Patent [19]
Anderson

[11] Patent Number: 5,334,313
[45] Date of Patent: Aug. 2, 1994

[54] REDUCTION OF ACRYLONITRILE IN WASTEWATER FROM THE PRODUCTION OF ABS PLASTIC

[75] Inventor: Oscar E. Anderson, Belpre, Ohio

[73] Assignee: General Electric Company, Pittsfield, Mass.

[21] Appl. No.: 949,962

[22] Filed: Sep. 24, 1992

[51] Int. Cl.$^5$ .............................................. C02F 3/12
[52] U.S. Cl. .................... 210/624; 210/625; 210/626; 210/904; 210/908
[58] Field of Search .............. 210/620, 623, 624, 625, 210/626, 904, 908

[56] References Cited

U.S. PATENT DOCUMENTS

| | | | |
|---|---|---|---|
| 1,700,722 | 1/1929 | Imhoff | 210/624 |
| 2,419,492 | 4/1947 | Green | 210/624 |
| 3,386,911 | 6/1968 | Albertson | 210/624 |
| 3,940,332 | 2/1976 | Kato et al. | 210/904 |
| 4,278,582 | 7/1981 | Miller | 210/749 |
| 4,488,968 | 12/1984 | Hong et al. | 210/625 |
| 4,919,815 | 4/1990 | Copa et al. | 210/624 |
| 4,971,698 | 11/1990 | Weber et al. | 210/908 |
| 5,026,485 | 6/1991 | Anderson | 210/723 |
| 5,116,744 | 5/1992 | Ingvorsen et al. | 210/904 |

Primary Examiner—Christopher Upton

[57] ABSTRACT

A process is disclosed for treating wastewater from a polymerization process. The wastewater contains volatile residual monomer, for example acrylonitrile monomer. The method includes the steps of pretreating the wastewater with an amount of oxygenated waste activated sludge to reduce the levels of residual monomer in the wastewater stream in order to reduce the volatilization of the volatile residual monomer into the atmosphere during further treatment of the wastewater stream. Preferably the process involves steps of neutralization, primary clarification, cooling, aeration and secondary clarification to provide a wastewater treatment process that has a minimum of air emissions of residual volatile hydrocarbon monomer and which provides a final treated water effluent that has the desired pH level, temperature, biological oxygen demand and a suspended solids level for emission of the treated water into the environment.

13 Claims, 1 Drawing Sheet

REDUCTION OF ACRYLONITRILE IN WASTEWATER FROM THE PRODUCTION OF ABS PLASTIC

BACKGROUND OF THE INVENTION

1. Field of the Invention

The present invention relates to processes for the removal of volatile hydrocarbon monomers from polymerization wastewater streams, and more particularly relates to the removal of acrylonitrile from polymerization wastewater streams.

2. Description of the Related Art

Acrylonitrile is the basis for a family of important commercial polymers. For example, copolymers of butadiene with less than 50% acrylonitrile provide oil resistant polymers. Copolymers of alkyl acrylates with acrylonitrile provide a range of polymer products. For example, when ethyl acrylate is the major component, oil elastomers are obtained; and when acrylonitrile is the predominant comonomer, useful molded plastic materials are obtained. Copolymers of a major proportion of styrene and minor proportions of acrylonitrile are also useful in modifying vinyl chloride polymers, as moldable plastics and as components as ABS resin blends. Normally, these acrylonitrile containing polymers are prepared by polymerization in water. Even when such polymerizations are substantially complete, there still remains an undesirable amount of unpolymerized acrylonitrile dissolved in the water on the order of several thousand to several hundred parts per million. Such wastewater streams typically result from water intensive polymerization processes such as emulsion polymerization, suspension polymerization and bulk/suspension polymerization.

Before such wastewater streams can be discharged into the environment, they must be properly processed to remove any solid polymerization products such as latex and resin; the pH of the wastewater stream must often be adjusted from pHs substantially different from 7, for example pHs below 3 or pHs above 10, to a pH of approximately 7.0; the wastewater stream then must have suspended solids removed by primary clarification which involves the addition of flocculent aids to form sludge which is then thickened and dewatered for landfill disposal, the effluent from the primary clarifier is then often cooled by methods such as spray coolers to reduce the temperature of the wastewater stream from a high temperature such as 120° F., to a lower temperature such as 105° F. to permit the activity of mesophilic organisms during an aeration step. During the aeration step, the mesophilic organisms reduce the biological oxygen demand of the water by consuming dissolved organic materials that are held therein by the introduction of waste activated sludge and air into an aeration basin. The product from the aeration process is then taken to a secondary clarifier where the water effluent therefrom can be further treated and filtered prior to environmental discharge within the regulatory parameters. A problem with such a process can be that volatile hydrocarbon monomers, for example acrylonitrile monomers, in the original wastewater stream, can volatilize prior to treatment in the aeration basin, for example the monomers can volatilize in the neutralization basins of the neutralization process, from the primary clarifier, or most likely from the spray cooler process.

Accordingly, there is a need to reduce the residual volatile hydrocarbon monomers, for example acrylonitrile, from the wastewater stream, prior to aeration of the wastewater stream, and more particularly prior to spray cooling of the wastewater stream and/or primary clarification of the wastewater stream.

SUMMARY OF THE INVENTION

Residual volatile hydrocarbon monomer, for example acrylonitrile monomers, dissolved in polymerization wastewater streams is removed in large part prior to volatilization of the monomer into the atmosphere. Reduction and removal of the residual monomer is achieved by pretreatment of the wastewater stream with an amount of activated sludge effective to reduce the level of residual monomer in the wastewater stream prior to aeration of the wastewater stream, more preferably prior to spray cooling of the wastewater stream, and most preferably prior to primary clarification of the wastewater stream. Preferably the waste activated sludge is obtained from a secondary clarifier following aeration of the wastewater.

DETAILED DESCRIPTION OF THE INVENTION

Figure 1:
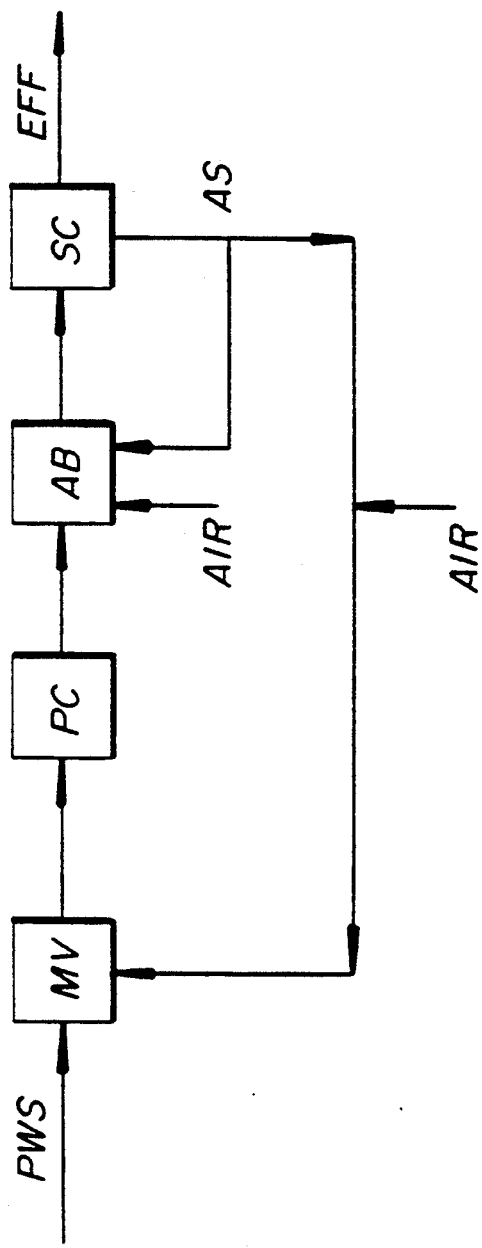
FIG. 1 is a schematic drawing of the process of the present invention wherein PWS stands for polymerization waste stream, MV stands for for mixing vessel, PC stands for primary clarifier, AB stands for aeration basin, SC stands for secondary clarifier, EFF stands for effluent, AS stands for activated sludge, AIR stands for air or other oxygen containing source.

A general overview of the present process is provided schematically in FIG. 1.

The present invention involves a wastewater treatment process for reducing the volatilization of residual hydrocarbon monomers from polymerization wastewater streams. The process involves steps of (a) addition of activated sludge to the polymerization wastewater stream, (b) primary clarification of the polymerization wastewater stream after addition of the activated sludge, (c) aeration of the water effluent stream from the primary clarification step in the presence of additional activated sludge to reduce the biological oxygen demand of the stream and (d) secondary clarification of the product from the aeration step. The invention also involves a wastewater treatment process for the reduction of residual hydrocarbon monomer, for example acrylonitrile monomer, in an aqueous medium comprising the monomer. The process involves the steps of (a) addition of an amount of activated sludge to the aqueous medium prior to primary clarification thereof to reduce the level of monomer in the aqueous medium prior to primary clarification thereof, (b) primary clarification of the aqueous medium, (c) aeration of the aqueous medium and (d) secondary clarification of the medium.

As mentioned above, typical treatment processes for the treatment of wastewater streams from polymerization processes, often involve a number of activities to make the wastewater suitable for discharge into the environment. Those activities often include removal of large solid polymerization products, adjustment of the pH of the wastewater stream, removal of suspended solids from the wastewater stream, adjustment of the temperature of the wastewater stream, biological treatment of the wastewater stream to reduce the biological oxygen demand of the stream, and removal of the biosludge generated during biological treatment of the wastewater. While such processes are effective for providing a final dischargeable water stream that has the desired pH, temperature, biological oxygen demand, and solids content, such processes can experience volatilization into the atmosphere of a substantial amount of residual volatile hydrocarbon monomers in the wastewater stream prior to biological treatment in the aeration step. The present invention provides for early biological treatment of the residual hydrocarbon monomers in order to biologically digest such monomers before they have a sufficient opportunity to volatilize into the atmosphere.

Also as mentioned above, a typical wastewater treatment process for the treatment of wastewater from polymerization systems typically involves (a) large particle removal, (b) pH adjustment, (c) primary clarification, (d) temperature adjustment, (e) biological oxygen demand depletion, (f) secondary clarification, (g) tertiary filtration and (h) sludge conditioning. The process of the present invention further includes pretreatment of the wastewater stream prior to aeration, the pretreatment involving the addition of activated sludge into the wastewater stream before the aeration step, preferably before the cooling step, and more preferably before the primary clarification step. Preferably the activated sludge is oxygenated so that the activated sludge is saturated with oxygen so that it can have sufficient biological activity upon addition to the wastewater stream in order to digest residual hydrocarbon monomers, for example acrylonitrile monomer, in the wastewater stream.

Large particle removal can be achieved by a Jeffrey type catenary bar screen. Such bar screens are well known in the art and are designed to remove large material from the wastewater as it flows through the screen. These materials may be for example latex, coagulum, or large resin particles. Materials caught by the screen may be removed from the screen by methods such as an automatic rake. Suitable bar screens and rakes are well known in the art. Entrapment basins may be employed in the process to control flow levels and prevent spills from the treatment system.

The pH adjustment step, typically involves adjustment of the pH from a very low pH, for example between 1 and 3 to a pH of approximately 7. Raising of the pH may be done by a neutralization step involving the addition of lime to the wastewater stream. The addition of lime may be done in steps to improve the control of the final pH of the wastewater stream. Equalization basins may be employed in the process to control the temperature, flow and pH of the wastewater stream sufficiently to control the inputs into the steps following the equalization basin.

Primary clarification involves flowing the wastewater stream into a primary clarifier. The primary clarification involves the removal of a substantial amount of suspended matter but little or no colloidal and dissolved matter. The suspended matter is removed by the addition of flocculent aids into the clarifier wherein the water and the flocculent aids are sufficiently mixed in a recirculation drum by a turbine in an action sufficient to precipitate the suspended solids thereby forming a sludge which settles to the bottom of the clarifier. The sludge is preferably raked to the center of the clarifier which has a downward conical shape, and then is pumped off through a sludge conditioning tank wherein the sludge is further thickened by the addition of flocculent aid, is then vacuum filtered and dewatered sufficiently for disposal to a landfill. Wastewater effluent from the primary clarification step is obtained as water flows to the top of the clarifier drum and over the top of the clarifier drum. Concentration of sludge in the primary clarifier is preferably at a level of approximately 1% by volume based on the total volume of the clarifier. The flocculent aid is preferably a polymeric type flocculent, however, other flocculents well known in the art may also be employed.

Following primary clarification of the wastewater stream, the water effluent therefrom is preferably temperature adjusted to a temperature suitable for the aeration step, preferably a temperature of between 80° F. and 109° F., more preferably between 100° F. and 106° F., more preferably between 103° F. and 105° F. Temperature adjustment may be achieved by employment of spray coolers which are well known in the art. As mentioned previously, an equalization basin may be employed to reduce the variation in the pH, temperature and flow rate of the wastewater stream as it enters the aeration basin thereby permitting a greater degree of control in the biological treatment of the wastewater stream. For final discharge of the wastewater into the environment, water is most preferably at a temperature of less than 90° F.

The aeration step involves biological oxygenation of the wastewater stream in an aeration basin. Such aeration basins are well known in the art of wastewater treatment. In the aeration basin the environment is sufficiently controlled to allow a complex microbiological society to consume and stabilize organic pollutants, for example residual organic monomers. The aeration step performs several functions, first and foremost being the transfer of oxygen into the wastewater stream, second being keeping the basin contents in continual motion so that the microorganisms and the hydrocarbon materials are brought into rapid and close contact, and third is the prevention of sludge settling into the basin wherein the sludge deposits could become septic and increase the biological oxygen demand load as they decompose. The degree of biological oxygen demand removal is dependent upon retention time, adequate oxygen in the maintenance of proper numbers of microorganisms in the sludge mass. The number of microorganisms is measured grossly by determining the mixed liquor suspended solids (MLSS), preferably the MLSS value is between 2,500 to 4,000 mg of suspended solids per liter of wastewater. The MLSS concentration may be adjusted by increasing or decreasing the amount of sludge recirculated from the secondary clarifier. Preferably the aeration system is designed to remove at least 95% of the influent biological oxygen demand load taking into account the oxygen requirements, retention time, organic load and sludge concentration factors of the system.

The secondary clarification step involves flowing the product from the aeration step to a secondary clarifier which are well known in the art. A flocculent aid is added to the wastewater stream in the secondary clarification step to force precipitation of the suspended solids from the wastewater stream and permit clarification of the treated wastewater before discharge into the environment so that the suspended solids content in the treated wastewater is within legal limits. The precipitated solids are entrapped as a bio-sludge which a portion thereof is returned to the aeration basin to act as activated sludge in the aeration step. The treated water from the secondary clarification step may be further filtered in a tertiary filter prior to discharge into the environment.

The present invention involves diverting a portion of the activated sludge from the secondary clarifier and mixing it with the wastewater stream at a point prior to the aeration step, preferably prior to the temperature adjustment step, for example the spray cooling step, and more preferably prior to the primary clarification step. A suitable point for mixing the pretreatment amount of activated sludge is at the pH adjustment step wherein an amount of the activated sludge can be added to the wastewater stream in the neutralization basins and sufficiently admixed with the wastewater stream to permit biological digestion of a substantial amount of the residual monomer in the wastewater stream. Preferably the activated sludge is treated with air so that the activated sludge is saturated with oxygen prior to addition of the waste activated sludge into the wastewater stream during the aforesaid pretreatment. More preferably, the pH adjustment is conducted in a neutralization basin which is closed to the atmosphere so that volatile residual monomers are not permitted to volatilize therefrom into the atmosphere, and so that such residual volatile monomers, for example acrylonitrile monomer, remain in the wastewater stream so that they can be acted upon by the activated sludge. Preferably the activated sludge is recycled from the secondary clarifier to a point early in the treatment system and added to the wastewater in an amount sufficient to cause a reduction of 25% by weight of the residual monomer based on the total amount of residual monomer initially in the wastewater stream just prior to addition of the activated sludge, more preferably resulting in a reduction of at least 40% by weight of the acrylonitrile, and more preferably at least 50% by weight of the acrylonitrile. Reduction of the acrylonitrile level in the wastewater stream occurs rapidly upon addition of the activated sludge, requiring approximately one hour retention time or less to effectively reduce the acrylonitrile level by the stated percentages. Preferably the activated sludge is added between the neutralization surge basin and the primary clarifier and is subsequently removed by the primary clarifier. To avoid the problem of volatilization of the residual monomer, for example acrylonitrile, the mix tanks employed for pH adjustment of the wastewater should be designed as closed systems to that the tanks are closed to the atmosphere to prevent volatilization of the residual monomer from the tanks. Preferably the activated sludge is thoroughly oxygenated to saturate the activated sludge with oxygen prior to introduction into the wastewater stream as a pretreatment. Supplying the oxygen to the activated sludge is important for two reasons, the first being that the oxygen prevents the activated sludge from going septic prior to being introduced into the pretreatment mix tank with the wastewater stream, and secondly the wastewater stream has very little oxygen therein which the waste activated sludge could use upon mixing therewith. The activated sludge is able to quickly absorb the acrylonitrile monomer, and when combined with a limited oxygen supply in the mixing step results in the rapid occurrence of acrylonitrile reduction, thereby making the hold up time in the mixing tank of relatively low importance. The activated sludge is preferably added to the polymerization wastewater stream at a level of from 0.001% to 0.05% by biomass of activated sludge per liter of wastewater.

At average influent water temperatures of 120° F., less than a 10% reduction in acrylonitrile levels will be seen as a result of the activated sludge pretreatment. Several different mix tank temperatures were tried to establish a temperature "break point" above which the activated sludge bacteria was no longer effective and degrading acrylonitrile. This break point is 105° F. This is because the biomass employed in the following examples was a mesophilic biomass, and mesophilic organisms are active at temperatures of up to 105° F., with their activity quickly declining above 105° F. Typically, temperatures between 110° and 120° F. are a "no-mans land" for bacteria, with the temperatures being too high for mesophilics and too low for thermophilics.

EXAMPLES

Table 1 shows the average acrylonitrile (AN) reductions obtained at different temperatures and hold up times. At all hold up times the maximum reduction of AN occurred at 105° F. Above 105° F. biological activity rapidly declines and by 120° F. very little reduction was seen. At all temperatures, hold up time had no significant impact on AN reduction. It is theorized that rapid oxygen depletion by the (WAS) in the mix tank was responsible for the fact that hold up time was not significant. Data from this study is found in the appendix.

TABLE 1

AN Reduction at Different Temperatures and Hold Up Times (at 101 mg/l MLSS concentration)

| Temperature | Average AN Inf. | Average N Eff. | 0.5 HUT AN Reduction | Average % Reduction | Number of Samples |
|---|---|---|---|---|---|
| 100 | 108 ppm | 60 ppm | 48 ppm | 44 | 12 |
| 105 | 28 ppm | 9 ppm | 19 ppm | 68 | 2 |
| 110 | 106 ppm | 76 ppm | 30 ppm | 28 | 2 |
| 120 | n.s | n.s | n.s | n.s | 0 |

| Temperature | Average AN Inf. | Average N Eff. | 1.0 HUT AN Reduction | Average % Reduction | Number of Samples |
|---|---|---|---|---|---|
| 100 | 79 ppm | 37 ppm | 42 ppm | 53 | 21 |
| 105 | 97 ppm | 43 ppm | 54 ppm | 56 | 3 |
| 110 | 130 ppm | 93 ppm | 37 ppm | 28 | 5 |
| 120 | n.s | n.s | n.s | n.s | 0 |

| Temperature | Average AN Inf. | 2.0 HUT Average N Eff. | AN Reduction | Average % Reduction | Number of Samples |
|---|---|---|---|---|---|
| 100 | 67 ppm | 29 ppm | 38 ppm | 57 | 11 |
| 105 | 112 ppm | 40 ppm | 72 ppm | 64 | 1 |
| 110 | 100 ppm | 66 ppm | 34 ppm | 34 | 2 |
| 120 | 81 ppm | 74 ppm | 7 ppm | 9 | 9 | n.s. = no samples

As the amount of available WAS varies, so would AN reduction. To demonstrate how increased WAS would affect AN reduction, the MLSS concentration going to the mix tank was increased from an average MLSS of 101 mg/l to 182 mg/l. As would be expected, increasing the MLSS provided greater AN reduction. As seen in Table 2, at 100° F. and 1.0 (hours of hold up time) HUT, AN reduction went from 53% to 64% with the WAS concentration increased. It can be further deduced that reducing the available MLVSS would likewise reduce the AN reduction. Consequences of changes in the production area or changes in operational parameters of the treatment system which would alter the amount of WAS would change the amount of AN reduction which could be expected from this WAS recycling approach.

TABLE 2

AN Reduction With Increased WAS Concentration
(Mix Tank MLSS concentration of 182 mg/l and 1.0 HUT)

| Temperature | Average AN Inf. | Average AN Eff. | AN Reduction | Average % Reduction | Number of Samples |
|---|---|---|---|---|---|
| 100 | 110 ppm | 40 ppm | 70 ppm | 64% | 25 |

Average AN Inf. means average acrylonitrile level in the influent and a parts per million level.

Average AN Elf. means average acrylonitrile level in the effluent after pretreatment with the waste activated sludge as measured in parts per million.

HUT means hold up time as measured in hours.

mg/l MLSS concentration means milligrams of suspended solids per liter of wastewater, and more particularly means milligrams of waste activated sludge added per liter of wastewater.

As illustrated by the examples the recycling of waste activated sludge as a pretreatment of the wastewater results in a reduction of the acrylonitrile level in the wastewater thereby resulting in downstream reductions and emissions of acrylonitrile into the atmosphere. It is estimated that the present process may result in reduced emissions of acrylonitrile of as high as 75% to 85% as compared to wastewater which is not pretreated with activated sludge. The process preferably employs a hold tank for the recycled activated sludge where in the activated sludge is aerated in the tank so as to prevent the activated sludge from going septic, and this tank would also serve as a surge tank to allow even flow of activated sludge to the pretreatment mixing tank. Preferably the mixing tank has a sufficient size volume to provide a hold up time based on the flow rate of the wastewater stream to permit adequate time for the activated sludge to digest the residual hydrocarbon monomer during pretreatment. Preferably the mixing tank has a mixer which sufficiently agitates the activated sludge and wastewater so as to thoroughly mix the activated sludge into the wastewater stream. The activated sludge is preferably aerated prior to its addition to the pretreatment mix tank. Oxygenation of the activated sludge may be achieved by using a fine bubble diffuser to sufficiently oxygenate the activated sludge prior to addition of the activated sludge to the mix tank.

What is claimed is:

1. A wastewater treatment process for the reduction of residual acrylonitrile monomer in an aqueous medium comprising said monomer, said process comprising the steps of:
   (a) addition of oxygenated activated sludge to said aqueous medium to reduce the level of residual acrylonitrile monomer in said aqueous medium by aerobic digestion,
   (b) primary clarification of said aqueous medium to separate a sludge from a water effluent,
   (c) aeration of said water effluent in the presence of activated sludge to produce a product having a reduced biological oxygen demand compared to said water effluent,
   (d) secondary clarification of said product to produce activated sludge and a wastewater stream, and
   (e) oxygenating said activated sludge and recycling said oxygenated activated sludge to the addition step (a).

2. The process of claim 1 wherein said process further comprises a step of spray cooling said aqueous medium between said primary clarification step and said aeration step.

3. The process of claim 2 wherein said aqueous medium is at a temperature of below 106° F. immediately prior to the addition of activated sludge.

4. The process of claim 3 wherein said aqueous medium has a pH between 7.0 and 9.0 prior said aeration step.

5. The process of claim 3 wherein prior to said mixing step, said aqueous medium has a temperature which is adjusted from above 110° F. to below 106° F.

6. The process of claim 1 wherein said activated sludge is added to said aqueous medium in a mixing vessel which is closed to the atmosphere to reduce volatilization of the acrylonitrile monomer from the mixing vessel.

7. The process of claim 1 wherein prior to said primary clarification, said aqueous medium has a pH which is adjusted from below 4 to above 6.

8. A process for reducing the volatilization of hydrocarbon monomers from a wastewater stream from a polymerization stream, said process comprising the steps of:
   a) addition of an oxygenated activated sludge to the stream to reduce the level of hydrocarbon monomers in said stream by aerobic digestion prior to primary clarification of said stream;
   b) primary clarification of said stream;
   c) aeration of said stream; and
   d) secondary clarification of said stream to produce a treated effluent and settled activated sludge, and
   e) oxygenating said activated sludge and recycling said oxygenated activated sludge to the addition step a).

9. The process of claim 8 wherein said stream has a temperature of below 106° F. during the addition of said activated sludge.

10. The process of claim 9 wherein said stream is spray cooled between said primary clarification step and said aeration step to reduce the temperature of said stream to a temperature below 96° F.

11. A process for reducing the volatilization of residual hydrocarbon monomers from polymerization wastewater streams, said process comprising the steps of:
   a) addition of an oxygenated activated sludge to said polymerization wastewater stream to reduce the level of hydrocarbon monomers by aerobic digestion,
   b) primary clarification of said polmerization waste water stream after the addition of said activated sludge, said primary clarification step involving separation of steam into a primary clarifier sludge and a primary clarifier water effluent, said primary clarifier water effluent having a biological oxygen demand of greater than 400 mg/l,
   c) aeration of said water effluent stream in the presence of additional activated sludge to produce an aerated effluent stream having a biological oxygen demand of a level less than 10 mg/l,
   d) secondary clarification of said aerated effluent stream to produce a treated effluent and settled activated sludge, and
   e) oxygenating said activated sludge and recycling said oxygenated activated sludge to the addition step a).

12. The process of claim 11 wherein said activated sludge is added to said polymerization wastewater stream at a level of from 0.001% to 0.05% by biomass of activated sludge per liter of wastewater.

13. The process of claim 11 wherein said activated sludge is added to the polymerization wastewater stream at a point where the polymerization wastewater stream has a temperature of from between 100° F. and 105° F.

* * * * *